Sept. 6, 1955  A. F. WALTERS  2,717,162

SAFETY GUARD FOR AUTOMOBILE PASSENGERS

Filed Aug. 19, 1952

INVENTOR.
ALBERT F. WALTERS.
BY Marvin B. Davis
ATTORNEY

United States Patent Office 2,717,162
Patented Sept. 6, 1955

2,717,162
SAFETY GUARD FOR AUTOMOBILE PASSENGERS

Albert F. Walters, Kansas City, Mo.

Application August 19, 1952, Serial No. 305,181

5 Claims. (Cl. 280—150)

This invention relates to an improved safety guard for passengers in a motor car and more particularly to one that can be collapsed into a compartment below the windshield of the car.

Heretofore numerous accidents have occurred on the highways where the passengers are frequently thrown into or through the windshield of a motor car thus maiming or killing them. The cutting of arteries and veins often causes quick death.

An object of the present invention is in the provision of a stiff member being mounted on the fire wall of a car and projecting upward for support of a safety guard member spread in front of the torso of one or more passengers to prevent them from being thrown into the windshield of the car when an accident occurs. In head-on collisions one or more of the passengers may be bruised on the body from the guard but this is preferable to being thrown into the glass windshield. The improved safety guard prevents the passenger from being catapulted from his seat.

Another object of the present improved invention is in the provision of a collapsible stiff member for the spacing and support of the safety guard from the fire wall of a motor car that can be collapsed into a compartment below the windshield when not in use. This is most useful when mechanics or others are servicing the car or when only the driver occupies the car.

Another object of the present improved invention is in the provision of a collapsible guard member whereby its length may be shortened to the extent of passing it into a compartment below the windshield.

With these objects in view the invention may be more fully understood from the accompanying drawing, the specification and the scope of the appended claims.

Figure 1:
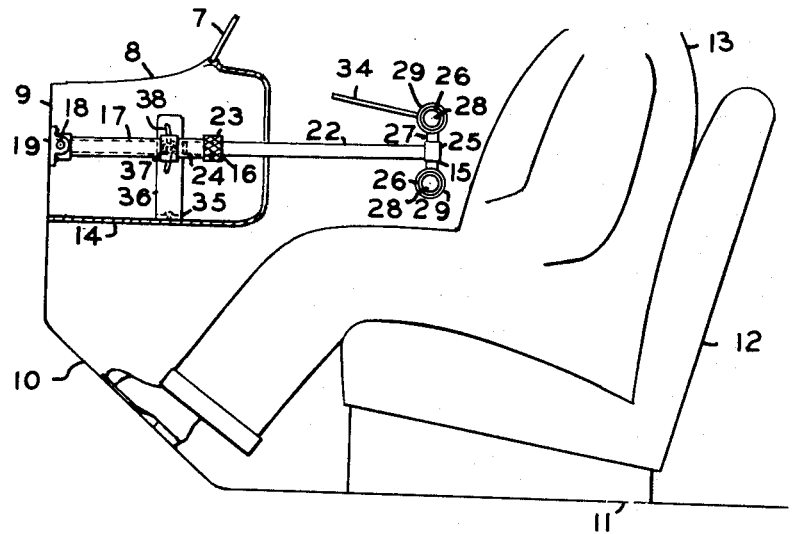
Figure 1 illustrates an outline of a motor car front seat, a portion of the windshield, a cowl, fire wall, foot board, floor, and the improved collapsible guard mounted on the fire wall and extended to a position in front of a passenger for the protection thereof.

The standard motor car parts illustrated are the windshield 7, cowl 8, fire wall 9, foot board 10, floor 11, and seat 12 all being shown by mere outline with a passenger 13 positioned in the seat.

A compartment 14 is located below the windshield 7 and cowl 8 and to the rear of the fire wall 9 and is of sufficient size to receive the collapsed safety guard 15 and collapsed stiff member or members 16.

The stiff tube members 17 are provided with trunnion members 18 on one end thereof and fitted into bearings 19 secured to the fire wall 9. The opposite end of the stiff tube members 17 are provided with tapered threads 20 and slots 21 cut parallel with the axis of the tubes a sufficient distance as illustrated for the tube ends clutching the collapsible stiff tube members when the taper threaded collars 23 are screwed on the tapered threads 20.

The collapsible stiff members 22 may have the ends 24 extended through the fire wall 9 when considerable movement is required as shown in dotted lines, and the opposite end of the tubular members are rigidly connected with the center horizontal transverse guard member 25. The guard member tubes 26 are spaced from the center guard 25 by connecting members 27, one guard member tube being above the center member and the other being below it. The collapsible guard tubes 28 are slidable within the guard member tubes 26 and are held in position by the clutch collars 29 having tapered threads 30 to engage tapered thread 31 on the guard member tubes 26, the guard member tubes 26 being slotted parallel with the axis thereof for the contraction of the clutch end of the tube 32.

Figure 2:
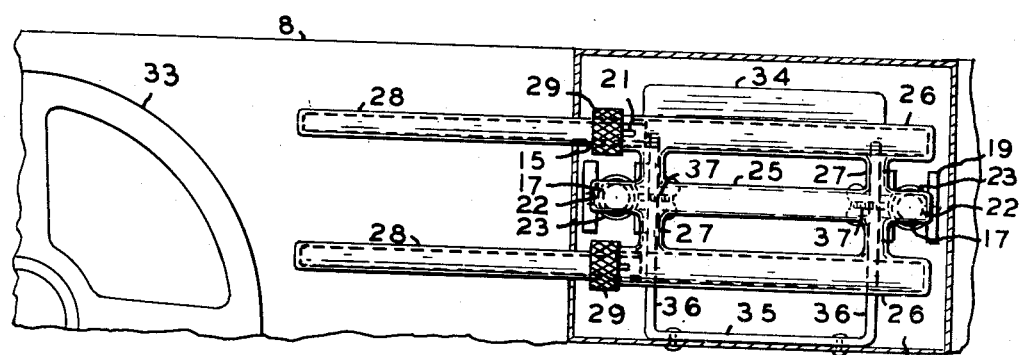
Figure 2 is an enlarged face view of the guard with the extended members projected to near the steering wheel of a motor car, the compartment being illustrated behind the face of the guard.
Figure 3:
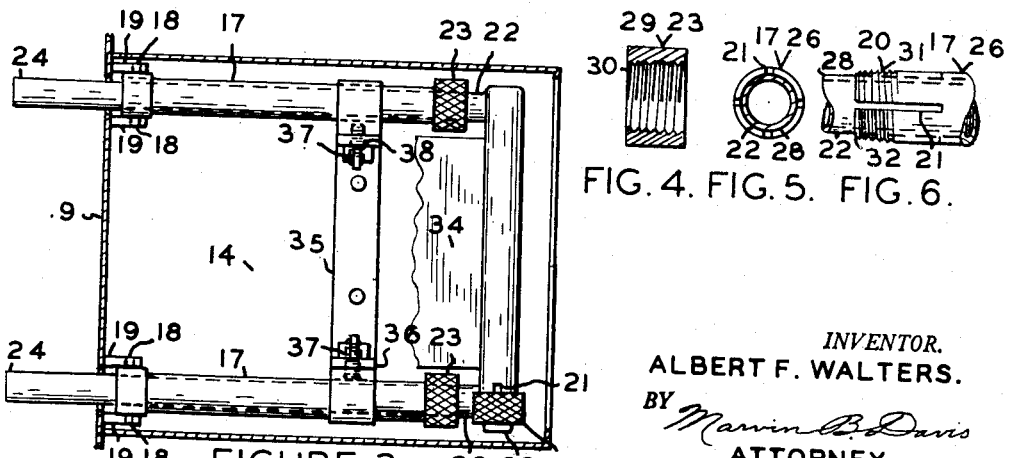
Figure 3 is a plan view of the guard as illustrated in Figure 2 with the exception that the guard members are collapsed and the stiff members are collapsed to the extent that they are all within the boundaries of the compartment.
Figures 4, 5, 6:
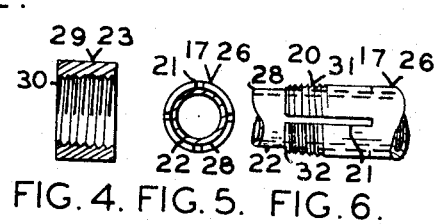
Figure 4 is an enlarged fragmentary view of the clutch collar for manually locking the extended tubes into any desired position.
Figure 5 is a fragmentary enlarged typical view of any of the stationary clutch tubes with a portion of an extendable tube illustrated therein.
Figure 6 is a side view of Figure 5 and illustrates the end of the outer tube with a taper thread and being slotted for clutching the inner tube through the means of the clutch collar of Figure 4 being manually applied.

It is apparent that the compartment provided for the guard is approximately the width of one passenger ordinarily occupying the seat at the opposide side from the driver and that the guard tubes are extended to a width corresponding to the space occupied by two passengers at the side of the driver. The compartment may or may not have a door for enclosure of the same. The steering wheel 33 is in front of the driver of the car and the extended guard members 28 are spaced from the steering wheel a sufficient distance to clear the driver's hands as illustrated in Figure 2.

A tray plate 34 is rigidly connected to the top guard member 26 and may be used for a table or desk by the passenger occupying the seat 12.

The bracket 35 is attached to the bottom of the compartment 14 and is provided with a pair of upright arms 36 spaced apart to receive the clamp bolts 37 connected to the stiff member 17. The slot 38 in each arm 36 is cut to a radius fulcrumed from the trunnions 18.

It is obvious from the foregoing description and specification that a motor car equipped with the improved guard will ordinarily have one or more passengers in the front seat. The driver will be seated behind the steering wheel and one or more passengers will occupy the remaining portion of the seat. The guard will be pulled rearward to extend the stiff member or members and be located in a conveniently spaced position from the passenger in the rear of the compartment. The clutch collars 23 are tightened, then the guard may be raised or lowered and the clamp bolts tightened on the slotted upright arms. If more passengers are in the seat the guard members 28 are extended to correspond to the width thereof and the clutch collars 29 are tightened. When an accident occurs the passengers will in most cases be held in the seat instead of being catapulted into more dangerous objects.

What I claim as new and desire to secure by Letters Patent is:

1. A safety guard for passengers in a motor car having at least a windshield and a firewall spaced in front of a seat and a transverse guard in front of a passenger having a longitudinal post connected thereto and to the firewall comprising; a tube member, a telescoping second tube member, the first mentioned said tube member being slotted on one end thereof and slidable over the second mentioned telescoping tube member, taper threads, said taper threads being on the end of said first mentioned tube member having the slots therein, a nut, said nut being taper threaded to fit said first mentioned threads, and said nut clamping said first mentioned tube to said second mentioned tube against movement to form the post between the firewall and the transverse guard.

2. A safety guard as claimed in claim 1 comprising; a transverse tube member forming the transverse guard, taper threads being on one end of said transverse tube member, a second transverse tube member telescoping into said first mentioned transverse tube member, and a nut with a taper thread engaging said taper threads to clamp said second transverse tube in a selected position against movement.

3. A safety guard for passengers in a motor car having at least a windshield and a firewall spaced in front of a seat comprising, an elongated tubular member, a second elongated tubular member, said second elongated tubular member being slidable inside of said first elongated tubular member, said first mentioned tubular member having one end thereof containing a plurality of slots cut longitudinally therein, said first mentioned elongated tubular member having the end with slots therein threaded, a clutch nut with taper thread, said clutch nut being threaded on the end of said first mentioned tubular member and clamping it to the second elongated tubular member, a transverse guard member, said transverse guard member being rigidly attached to said second mentioned elongated tubular member, and a means of attachment to the firewall being on the opposite end of said first mentioned elongated tubular member.

4. A safety guard as claimed in claim 3, said transverse guard member being tubular in shape, one end of said tubular shape of said transverse guard member being slotted and threaded, a tubular member slidable in said tubular shape of said transverse guard member, and a clutch nut with taper thread being screwed on the threaded end of said transverse guard member to clamp it to the tubular member slidable therein.

5. A safety guard for passengers in a motor car having at least a windshield and a firewall spaced in front of a seat and a transverse guard in front of a passenger having a longitudinal post connected thereto and to the firewall comprising; a pair of tube members, a pair of telescoping second tube members, the first mentioned said tube members being slotted on one end of each thereof and slidable over the second mentioned telescoping tube members, taper threads, said taper threads being on the ends of said first mentioned tube members having the slots therein, nuts, said nuts being taper threaded to fit said first mentioned threads, and said nuts clamping said first mentioned tubes to said second mentioned tubes in any desired telescoping position to form the post between the firewall and the transverse guard.

References Cited in the file of this patent

UNITED STATES PATENTS

| | | |
|---|---|---|
| 108,679 | Boyden | Oct. 25, 1870 |
| 1,548,870 | Crafton | Aug. 11, 1925 |
| 1,619,697 | Brown | Mar. 1, 1927 |
| 1,748,426 | Pentland | Feb. 25, 1930 |
| 2,245,899 | Campbell | June 17, 1941 |
| 2,322,755 | Voorhies | June 29, 1943 |
| 2,499,993 | Gregg | Mar. 7, 1950 |